May 28, 1935. G. K. HULL 2,003,049
APPARATUS FOR CUTTING OR BEVELING EDGES OF METAL PLATES
Filed March 8, 1934 4 Sheets-Sheet 1
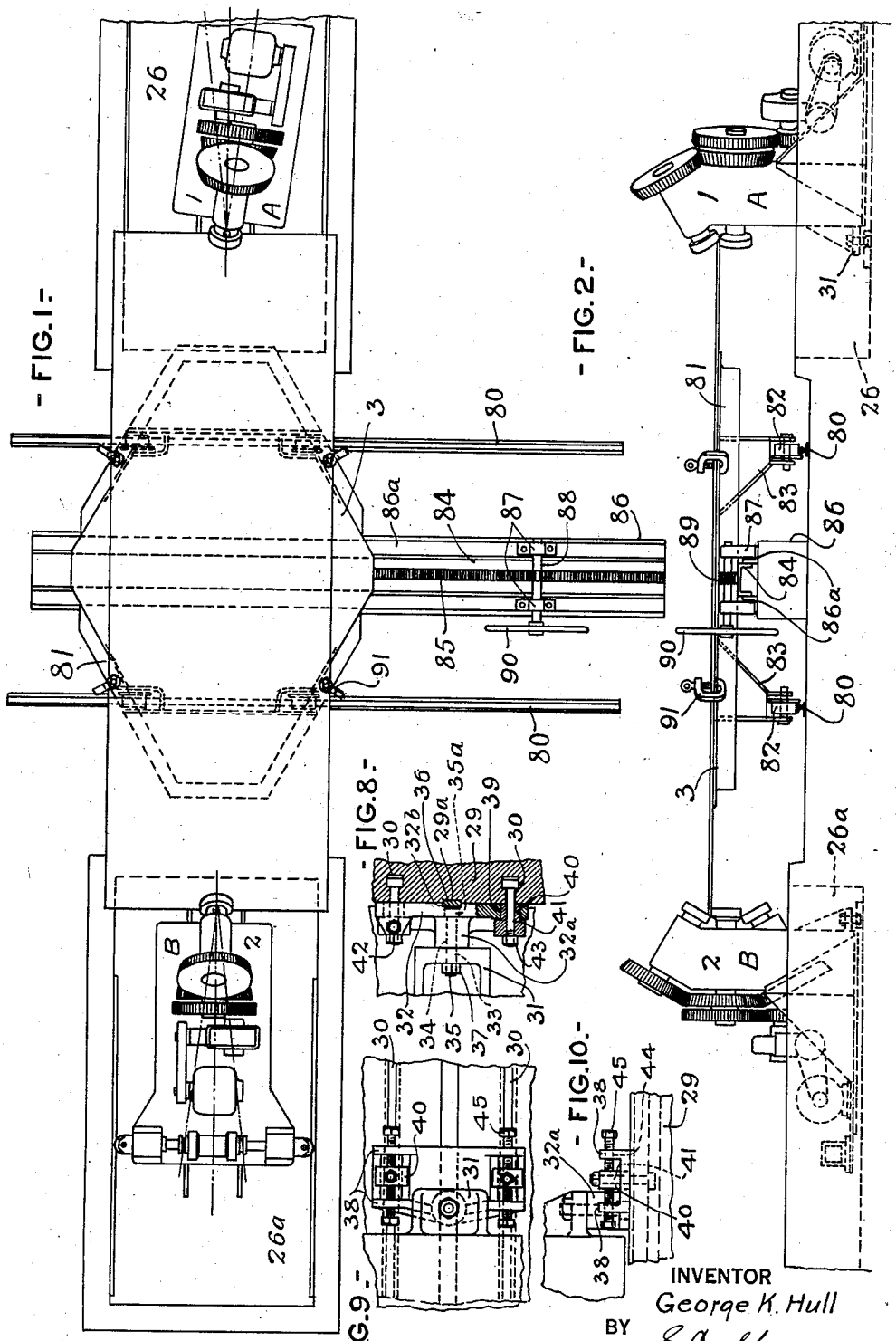
INVENTOR
George K. Hull
BY
S. C. Yeaton
ATTORNEY

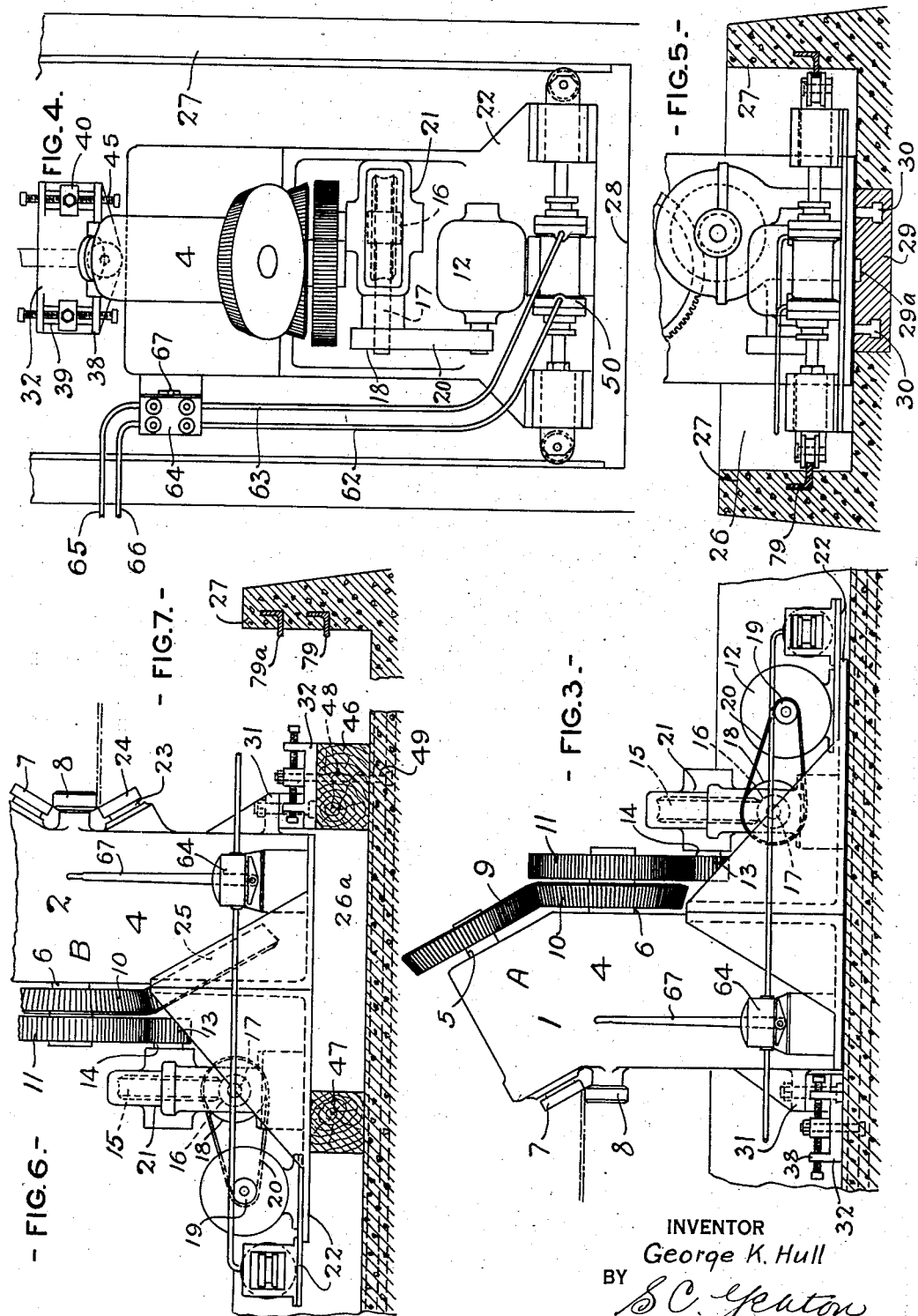

May 28, 1935.  G. K. HULL  2,003,049
APPARATUS FOR CUTTING OR BEVELING EDGES OF METAL PLATES
Filed March 8, 1934  4 Sheets-Sheet 3
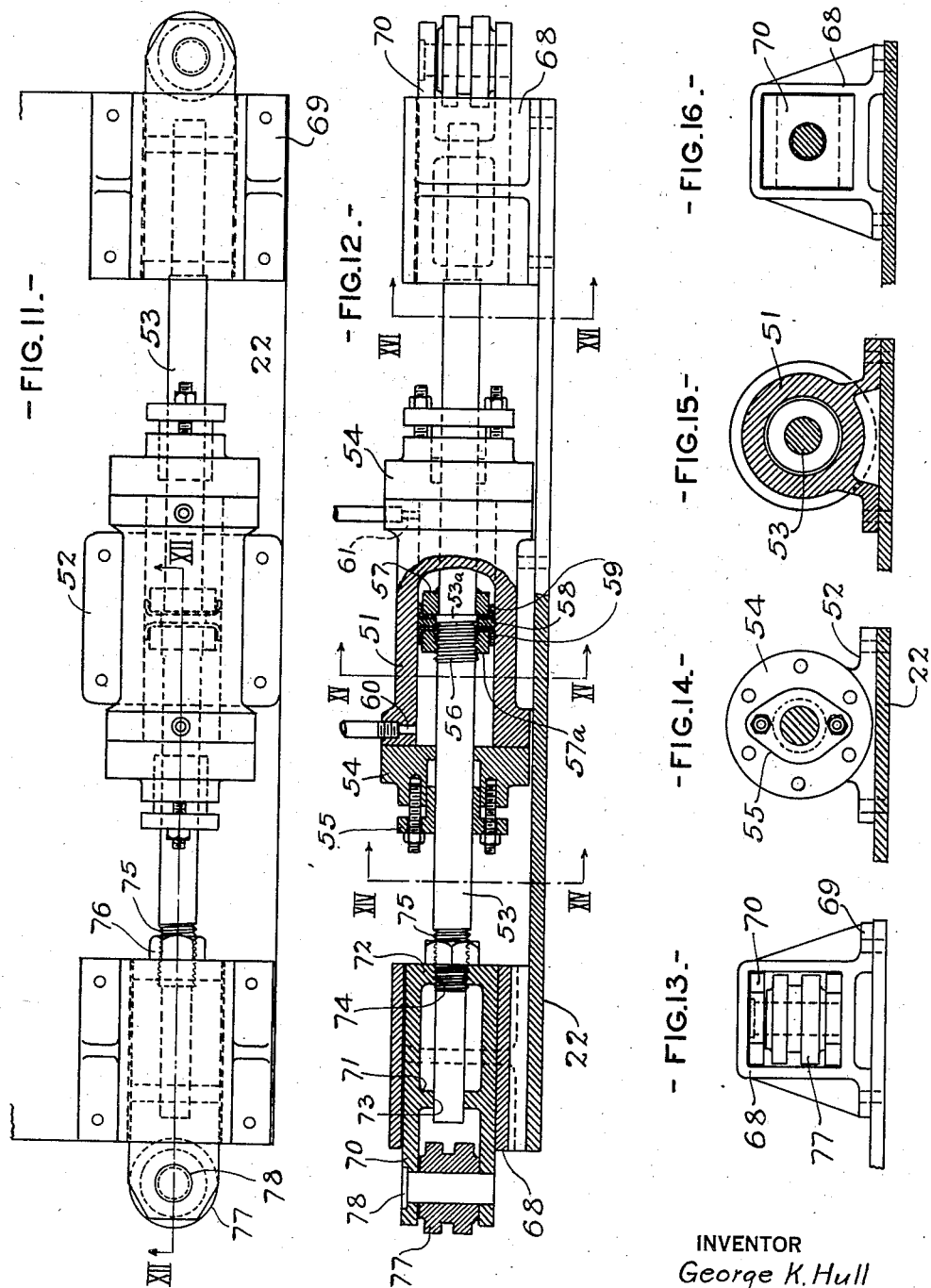
INVENTOR
George K. Hull
BY
ATTORNEY May 28, 1935. G. K. HULL 2,003,049
APPARATUS FOR CUTTING OR BEVELING EDGES OF METAL PLATES
Filed March 8, 1934 4 Sheets-Sheet 4
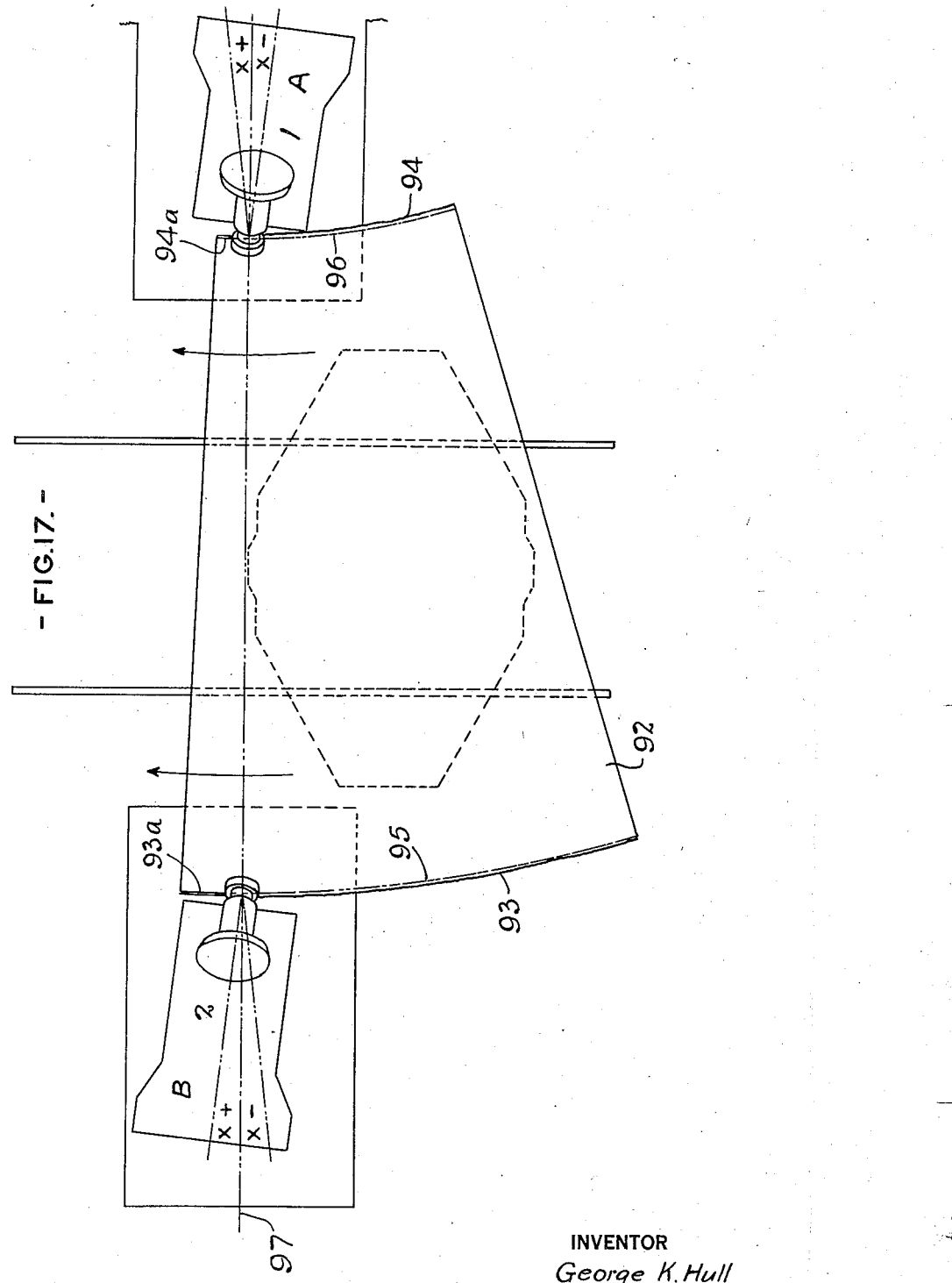
INVENTOR
George K. Hull
BY S. C. Yeaton
ATTORNEY Patented May 28, 1935

2,003,049

UNITED STATES PATENT OFFICE 2,003,049

APPARATUS FOR CUTTING OR BEVELING EDGES OF METAL PLATES

George K. Hull, Fredonia, N. Y.

Application March 8, 1934, Serial No. 714,624

11 Claims. (Cl. 164—60)

This invention relates to apparatus for cutting or beveling edges of metal plates and particularly to bevel shears of the type embodying motor driven circular shear blades.

An object of the invention is to provide an improved construction embodying a bevel shear of the type mentioned, wherein the shear is adjustable so that the angle of the blades to the edge of a plate being cut may be varied so as to ensure a smooth cut.

A further object is to provide controlled motor means for effecting the aforementioned adjustment.

A further object is to provide a construction embodying an improved arrangement of shear blades whereby a plate edge may be beveled in either of two oppositely slanting directions.

A further object is to provide a bevel shear of the type mentioned which is longitudinally adjustable to adapt it for use in connection with plates of various sizes.

A further object is to provide apparatus including two oppositely disposed constructions embodying bevel shears of the type mentioned, with one or both of the constructions improved in one or more of the ways aforedescribed, whereby any one of plates of various sizes may be accommodated and oppositely disposed edges of such plate may be simultaneously beveled along either straight or curved lines and the bevels may be cut in parallel slanting directions or in different slanting directions, relative to each other, as desired, an even, smooth cut being always assured.

Other and further objects of and advantages achieved by the invention will be apparent from the following description and the appended claims.

Referring to the drawings, Figure 1 is a fragmentary plan view of apparatus embodying the present invention; Fig. 2 is a fragmentary front elevation of the apparatus; Figs. 3 to 7 are enlarged fragmentary views showing parts of the apparatus, Fig. 3 being a side view of the construction shown at the right in Fig. 1, Fig. 4 a plan view of the construction shown in Fig. 3, Fig. 5 a fragmentary end view, with the pit and bed plate shown in section, of the construction shown in Fig. 3, Fig. 6 a fragmentary side view of the construction shown at the left in Fig. 1 with the shear in its elevated position, the pit being shown in section, and Fig. 7 a fragmentary transverse sectional view of one of the side walls of the pit for the shear shown in Fig. 6; Figs. 8 to 10 are fragmentary views of certain of the details of parts of the construction shown in Fig. 6, Fig. 8 being an end view, as viewed from the right, partly in section, showing the parts pivotally connecting the shear to the bed plate, Fig. 9 a plan view of the parts shown in Fig. 8, and Fig. 10 a side view of the parts shown in Fig. 8; Figs. 11 to 16 are further enlarged views of the adjusting cylinder and parts associated therewith of the construction shown in Fig. 6, Fig. 11 being a plan view, Fig. 12 an end view as viewed from the left, partly in section on the line XII—XII of Fig. 11, Fig. 13 a side view, Fig. 14 a section on the line XIV—XIV of Fig. 12, Fig. 15 a section on the line XV—XV of Fig. 12, and Fig. 16 a section on the line XVI—XVI of Fig. 12; and Fig. 17 is a diagrammatic plan view illustrating the operation of the apparatus shown in Fig. 1 in connection with the simultaneous shearing, in curved lines, of the opposite edges of a plate.

Referring in detail to the drawings, the apparatus of the embodiment of the invention illustrated therein comprises two oppositely disposed constructions A and B embodying bevel shears 1 and 2 respectively and a movable table 3 disposed between the two constructions for movably supporting a metal plate during a cutting (beveling) operation.

The constructions A and B are quite similar and therefore only the construction A will be described in detail, similar parts of the two constructions being designated by the same reference numerals and the differences between the two constructions will be hereinafter pointed out.

The shear 1 (see particularly Figs. 3 to 5) comprises a body or housing 4 in which are secured bearings (not shown) for shafts 5 and 6 of shear blades 7 and 8 respectively. The blades are secured to the inner ends, with respect to the apparatus, of the shafts. The shafts 5 and 6 and consequently the blades 7 and 8 are disposed at an angle to each other and the blades are set, all in the usual manner, so as to adapt the blades upon rotation to bevel shear the edge of a metal plate fed between their adjacent edges. Engaging beveled gears 9 and 10 are secured at the outer ends of the shafts 5 and 6 respectively. A gear wheel 11 is also secured to the shaft 6 beyond the bevel gear 10.

A reversible electric motor 12 is provided for driving the gear wheel 11 and consequently for driving the shear blades. Between the motor and the gear wheel 11 reducing gears are disposed including a gear wheel 13 engaging the gear wheel 11, the gear wheel 13 being carried by a shaft 14. A worm wheel 15 is secured to the shaft 14 and a worm 16 engaging the wheel 15 is carried by a shaft 17, a pulley 18 being secured at the outer end of this shaft. The motor is provided with a pulley 19 and a driving belt 20 connects the pulleys 18 and 19. A suitable manually operated electric motor control (not shown) of usual design is provided for the motor 12. The shafts 14 and 17 are provided with suitable bearings carried in a housing 21. The housing 21, motor 12 and reducing gears are mounted on supporting platforms 22 which are secured to the body 4 of the shear. All of the aforedescribed parts of the bevel shear are of usual well-known construction.

The bevel shear 2 is of a construction substantially identical with the bevel shear 1 with regard to all of the parts aforedescribed and such parts are indicated by the same reference numerals for the shear 2 as applied to their corresponding parts of the shear 1. The shear 2, however, includes an additional shaft 23 disposed below its shaft 6 which shaft 23 is set at an angle to the shaft 6 oppositely directed but equal to the angle of the shaft 5, in suitable bearings secured in the body 4 of this shear; a shear blade 24 which is secured to the inner end of the shaft 23; and a bevel gear 25 which is secured to the outer end of the shaft 23 and which engages the bevel gear 10 of this shear. The shafts 23 and 5 being set at opposite angles to the shaft 6, consequently their respective blades 24 and 7 will be set at opposite angles to the blade 8. Thus upon rotation of the blades a plate fed between the adjacent edges of the blades 7 and 8 of either the shear 1 or the shear 2 will be beveled in a downwardly and outwardly slanting direction relative to the plate, in the usual manner, which bevel will hereinafter be referred to as an outside bevel, while the edge of a plate fed between the blades 8 and 24 will be beveled in a downwardly and inwardly slanting direction relative to the plate, which bevel will hereinafter be called an inside bevel.

The shear 1 is disposed within a pit 26 and the shear 2 is disposed within a pit 26a. Each of these pits, except as hereinafter specifically pointed out, is of similar construction. The pivotal connecting means and the longitudinal adjustment means between each of the shears 1 and 2 and the respective base plates hereinafter described are of identical constructions and therefore only the construction A will be described with regard to these features. In this connection, while Figs. 8 to 16 have been hereinbefore described as views of the construction B shown in Fig. 6, these figures including Fig. 6 as before noted show parts identical with corresponding parts of the structure shown in Fig. 3 (construction A); therefore the same reference numerals have been employed to indicate like parts of both structures and for convenience the shear 1 and its adjacent structure (construction A) will be described in part with reference to these figures. The description in this regard, however, will be understood to apply equally to the shear 2 and its adjacent structure.

The pit 26 of the construction A comprises vertical side walls 27 and end walls 28, only one end wall being shown. A bed plate 29 is disposed in the bottom of the pit flush with the floor of the pit. The bed plate serves to support the shear 1. Two spaced longitudinal key ways 30 are formed in the bed plate 29. The key ways are of inverted T-shape in cross section and serve a purpose hereinafter described.

A horizontal lug 31 is provided at the inner end of the body 4, near the bottom thereof. A guide block 32 is disposed on the bed plate 29 at the inner end of the body 4, a portion of the guide block extending beneath the lug 31, and a boss 32a is formed on this portion. Aligned vertical bolt holes 33 and 34 are formed in the lug 31 and boss 32a respectively immediately below the adjacent points of the cutting edges of the shear blades. A bolt 35 is passed through the holes 33 and 34, a pivotal connection between the guide block 32 and body 4 being thus provided. It will be apparent that the shear 1 may be pivotally swung about the axis of the bolt 35, this axis passing through the cutting edges of the shear blades at their most proximate portions. The bolt 35 is provided with a square head 35a, and the hole 34 is enlarged and squared at its lower end to receive this head. A nut 37 is provided at the upper end of the bolt.

A longitudinal groove 29a is formed in the top of the bed plate centrally thereof, and a corresponding groove 32b is formed in the bottom of the guide block. A guide bar 36 is secured in the groove 29a and projects upwardly therefrom into the groove 32b, in working fit therewith. While the guide bar 36 permits the guide block to slide longitudinally it holds it, in all longitudinal positions, against lateral movement.

At each of the opposite sides of the block 32, two upwardly extending lugs 38 are formed. Between the lugs 38, on each side of the block, a slot 39 is formed, and a square-headed sleeve 40 extends through the slot 39 and bears upon the bed plate 29 with its head slightly spaced from the upper surface of the block 32. The opening 41 of each sleeve is disposed immediately above the key way 30 on its respective side of the base plate. An inverted square-headed bolt 42 is provided for each sleeve 40 and is extended through the opening 41 thereof and through the respective adjacent key way 30 with its head in the lower widened portion of the key way. The upper end of each bolt extends beyond the upper end of its respective sleeve and is provided with a nut 43. In each lug 38 a threaded opening 44 is provided opposite the square head of the respective adjacent sleeve 40, and a screw 45 is threadedly engaged in each opening 44, the inner end of each screw bearing against the head of its respective adjacent sleeve 40 and the outer end of each screw being headed.

It will be apparent that by virtue of the aforedescribed engagement of the block 32 with the bed plate, when the nuts 43 are loosened, the block and consequently the body 4, that is the entire shear 1, may be longitudinally adjusted to the approximate proper positions for beveling various sized plates. When the desired approximate longitudinal adjustment has been achieved the nuts 43 will be tightly drawn up on the bolts 42. Thereupon by proper adjustment of the several screws 45 the block 32 and hence the body 4 may be exactly longitudinally adjusted.

The floors of the pits 26 and 26a of the respective constructions A and B are at the same level and as the blade 24 is normally below the top of the plate supporting table 3 it is necessary to raise the construction B in order to cut an inside bevel, which raising may be done by a crane or otherwise, and to block up this construction in its raised position, which in the present instance is done by the blocks 46 and 47, as shown in Fig. 6. This makes it possible to simultaneously cut an inside bevel with the construction B and an outside bevel with the construction A. Holes 48 are formed in the block 46 opposite the key ways 30. When the shear 2 is vertically raised with the blocks 46 and 47 disposed therebeneath, elongated bolts 49 are employed in place of the bolts 42, serving the same function as the bolts 42 and being similarly disposed, the bolts 49 passing through the holes 48. The guide bar 36 shown in Fig. 8 is not shown in Fig. 6 and the bolts 49 are relied upon for holding the guide block 32 against lateral movement.

For swivelling the shear 1 about the axis of the bolt 35 hydraulic motor means, indicated generally by the numeral 50, are provided. These motor means comprises a cylinder 51 disposed at the outer end of the supporting platform 22. Bolting flanges 52 are formed on the cylinder and are bolted to the platform 22 by bolts (not shown). A piston rod 53 extends through the cylinder 51 extending outwardly therefrom at its opposite ends. A head 54 is secured to each of the opposite ends of the cylinder, the rod 53 passing through these heads. A packing gland 55 is secured to each head 54. Each gland 55 provides a stuffing box in which packing (not shown) is disposed to insure a water-tight working fit for the piston rod.

The central portion of the piston rod is enlarged to form a collar 53a and is threaded at one side of the collar as indicated at 56. A piston head 57 is secured to the rod against the collar on the unthreaded side by welding. A ring 58 is provided around the collar and suitable packing rings 59 are disposed on each side of the ring 58. A threaded follower ring 57a engages the threaded part of the rod at 56, holding the ring 58 and the rings 59 tightly together bearing against the head 57. The rings 59 extend between the head and follower ring and the inner surface of the cylinder, providing a water-tight fit therebetween.

Ports 60 and 61 are provided in the cylinder 51 near the respective opposite ends thereof for the admission and exhaust of water under pressure into and from the cylinder at said ends. The ports 60 and 61 are connected by pipes 62 and 63 respectively to a manually operated four-way control valve 64, suitably secured to the body 4 of the shear 1. A water supply pipe 65 connects the valve 64 with a source of water under pressure (not shown) for operating the piston. An exhaust pipe 66 connects the valve 64 to a drain (not shown). The valve, which may be of any well-known design, is provided with an operating lever 67 adapted to control the admission and exhaust of the water to and from the opposite ends of the cylinder 51 as desired, to move the piston relative to the cylinder, or more strictly to move the cylinder relative to the piston.

At each of the opposite sides of the supporting platform 22, opposite the respective ends of the cylinder 51, a guide box 68 is provided. The guide box and parts associated therewith at each side of the platform are of identical constructions and for the purpose of brevity only one will be described in detail (the one shown at the left in Fig. 12). This guide box is square in cross section and is provided with bolting flanges 69 which are secured to the platform 22 by bolts (not shown). A hollow crosshead 70 square in cross section is disposed within the guide box 68 and adapted to reciprocate therein. End members 71 and 72 are provided for the crosshead, and aligned circular openings 73 and 74 are provided in the members 71 and 72 respectively, the opening 74 being threaded. The end portion of the piston rod 53 at this side of the platform extends through the crosshead 70 passing through the openings 73 and 74 in the end members. The end portion is partially threaded as indicated at 75 for engagement with the threaded opening 74. A lock nut 76 is provided on the threaded portion at 75 adjacent the end member 72 for securing the piston rod to the crosshead so as to prevent the rod from turning. The upper and lower sides of the crosshead are extended beyond the end member 71 and a grooved roller 77 is disposed therebetween. A bearing pin 78 for the roller extends through and is secured to the extended portions of the sides.

In each of the side walls 27 of the pit 26 of the construction A an L-rail 79 is secured and extends longitudinally of the pit with one arm extending inwardly beyond the surface of the wall. The groove of roller 77 at each of the respective sides of the platform engages the extended edge of the rail at said side. Guiding means for the piston rod is thus provided at each side of the platform.

It will be apparent that while the rail and roller arrangements permit longitudinal movement of the shear and the piston rod and piston in the pit, the piston rod is held against movement transversely of the pit. When water under pressure is admitted to one end of the cylinder and exhausted from the other end, the cylinder will move relative to the piston and, the cylinder being secured to the platform 22, the outer end of the shear will be moved therewith, the shear thus being swivelled about the axis of the bolt 35. It will be apparent that by operation of the control valve 64 the cylinder and the adjacent end of the shear may be moved relative to the piston in either direction, as desired, to swivel the shear in the direction, and to the extent desired.

In the pit 26a of the construction B, in each of its opposite side walls, an additional L-rail 79a is provided above the rail 79, the upper rails being employed in connection with the rollers 77 when the shear 2 is used in raised position on the blocks 46 and 47. When the shear 2 is to be raised or lowered and the rollers 77 therefore must be disengaged from one pair of the L-rails and engaged with the other pair of L-rails, this may be easily accomplished by loosening the nut 76 and turning the piston rod so as to bring the opposite crossheads 70 and consequently the rollers 77 closer together and to thereby disengage the rollers from the first pair of L-rails and, after movement of the shear to proper raised or lowered position, by moving the rollers in a corresponding manner away from each other so as to engage the other pair of L-rails.

A pair of rails 80 is secured on the flooring between the pits, running transversely thereof. The table 3 comprises a platform 81 supported on four flanged wheels 82 suitably journalled in frame members 83 which are secured to the platform. A guide 84 is carried by the table. The guide is disposed beneath the platform centrally thereof and extends parallel to the rails 80. The guide 84 extends forwardly beyond the table and a rack 85 is provided at the upper surface of the forwardly extending portion thereof. A supporting block 86 provided with parallel spaced guide members 86a is secured on the flooring midway between the rails, the guide members being parallel with the rails and the guide 84 extending therebetween and being guided thereby. Suitable bearings 87 are secured on the upper surface of the block 86, and a shaft 88 is rotatably supported by these bearings. A pinion 89 engaging the rack 85 is secured to the shaft between the bearings. A hand wheel 90 is secured to an end of the shaft 88 for rotating the pinion to effect movement of the table over the rails.

In operation of the apparatus, for cutting outside bevels in straight parallel lines along the edges at the opposite ends of a plate, the plate will be secured to the table by clamps 91, or other suitable means, as shown in Figs. 1 and 2.

Whatever longitudinal adjustment of the shears is necessary will then be made in the manner hereinbefore described. Each of the shears will be controlled by a separate operator, the motors 12 will be started, and an operator will turn the hand wheel 90 so as to move the table over the rails and feed the edges at the opposite ends of the plate to the respective shear blades.

By manipulating the control lever 67 of the valve 64 for each of the respective shears the operators will when necessary swivel the shears in one direction or the other and thereby vary the angle of the cutting edges of the shear blades to the line of the cut. Thus any variations in thickness of the plate, hardness of the material of the plate, or amount of stock which must be removed from the edge of the plate will be compensated for by this adjustment or variance of the angle of the cutting edges of the shear blades, and a smooth bevel will be cut.

If it is desired to cut the opposite edges of a plate so that one edge will have an outside bevel and the other edge an inside bevel (that is, the slanting surfaces of the bevels will be parallel to each other) the shear 2 will be raised and supported on the blocks 46 and 47 so that the edge of the plate to be cut by this shear will be fed between the blades 8 and 24 as hereinbefore described.

In Fig. 17 the operation of the device is illustrated in connection with the simultaneous cutting of the edges at the opposite ends of a plate to provide bevels in concentric curved lines. The operation would be similar if the edges were cut to provide bevels in curved lines with the curves having the same radius. A plate 92 is here shown with its opposite edges 93 and 94 being cut by the respective shears 1 and 2. It will be apparent that at the stage of the operation shown, only parts 93a and 94a of the edges have been cut and the rest of the edges are in rough condition, as prepared prior to the beveling operation. This preparation may be made by punching or burning out the edges near the lines 95 and 96 along which it is desired to cut the bevels.

The line 97 is a line passed through the adjacent points of the cutting edges of the respective shear blades of the shears 1 and 2. When the shears are in exact intermediate positions this line coincides with their longitudinal center lines and therefore the line may be termed the common center line. Swivelling of the shears to one side or the other puts their respective center lines at angles to the common center line 97. For the purpose of this illustration the angles at one side of the common center line are indicated as X plus and the angles at the opposite side of the center line are indicated as X minus, and the shears and the cutting edges of their blades are considered as at an angle to the cutting line, either X plus or X minus whenever they are swivelled away from their intermediate positions. It will be apparent that for cutting the bevels along the curved lines 95 and 96 the shear 1 will be first set at an angle X minus and the shear 2 will be set at an angle X plus. The plate will not be rigidly secured to the table but will be permitted movement thereon so as to compensate for the changes in position made necessary by the differences in lengths of the edges to be cut and by their curvatures.

As the plate is fed to the respective shear blades the operators will swivel the shear 1 so as to vary its angle from X minus to X plus and will swivel the shear 2 so as to vary its angle from X plus to X minus. As the edges are being cut the shear blades will be caused, by the swivelling of the shears, to bite more deeply or less deeply into the plate according to the angles of their cutting edges to the respective plate edges and will follow the lines 95 and 96, cutting the plate edge along the line 96 concavely and the plate edge along the line 95 convexly. By the force of the shear blades the plate will be made to slide longitudinally of the table to adjust itself to proper positions during the cutting operation. Besides the above swivelling to effect the curves of the bevels, the shears will also be swivelled whenever necessary in order to compensate for variable thickness of the plate, difference in hardness of the plate, etc. as hereinbefore described.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. The combination of a bevel shear construction comprising adjacently disposed circular blades providing a pair of edges adapted to cut a plate along a line and to produce a bevel slanting in one direction and a second pair of edges vertically spaced from said first mentioned pair of edges adapted to cut a plate along a line and to product a bevel slanting in another direction, bearing means for said blades, and supporting means for said bearing means adapted to support said bearing means with said blades at either of two predetermined heights whereby one or the other of said pairs of edges may be operably positioned for cutting a plate at a fixed height; and a second bevel shear construction spaced from said first mentioned construction comprising adjacently disposed circular blades providing a pair of edges adapted to cut a plate along a line at one end of said plate and to produce a bevel slanting in a predetermined direction, bearing means for said blades, and supporting means for said bearing means adapted to support said bearing means with said blades at a predetermined height whereby said pair of edges will be operably positioned for cutting said plate at said fixed height while the other end of said plate is being cut by one or the other of said pairs of edges of said blades of said first mentioned bevel shear construction.

2. The combination of a bevel shear construction comprising adjacently disposed circular blades providing a pair of edges adapted to cut a plate along a line and to produce a bevel slanting in one direction and a second pair of edges vertically spaced from said first mentioned pair of edges adapted to cut a plate along a line and to produce a bevel slanting in another direction, bearing means for said blades, and supporting means for said bearing means adapted to support said bearing means with said blades at either of two predetermined heights whereby one or the other of said pairs of edges may be operably positioned for cutting a plate at a fixed height; and a second bevel shear construction spaced from said first mentioned construction comprising adjacently disposed circular blades providing a pair of edges adapted to cut a plate along a line at one end of said plate and to produce a bevel slanting in a predetermined direction, bearing means for said blades, and supporting means for said bearing means adapted to support said bearing means with said blades at a predetermined height whereby said pair of edges will be operably positioned for cutting said plate at said fixed height while the other end of said plate is being cut by one or the other of said pairs of edges of said blades of said first mentioned bever shear construction, the supporting means of one of said constructions being adapted to permit horizontal adjustment of the bearing means of said construction.

3. A bevel shear construction comprising adjacently disposed circular blades providing cooperating edges for cutting a plate along a line; bearing means for said blades; supporting means for said bearing means providing a pivotal supporting connection therefor in a vertical axis passing through said cooperating edges at their most proximate portions, and a movable supporting connection for swivelling said bearing means about said axis including a cylinder element and a piston element operatively disposed in said cylinder element, one of said elements engaging said supporting means for movement therewith and the other of said elements being held relatively fixed; and means for introducing and exhausting fluid under pressure into and from opposite ends of said cylinder element to effect relative movement of said elements and thereby effect said swivelling of said bearing means.

4. A bevel shear construction comprising a frame structure; adjacently disposed circular blades providing cooperating edges for cutting a plate; bearing means for said blades carried by said frame structure; a motor carried by said frame structure; means operably connecting said motor with said blades for rotating said blades; supporting means for said frame structure including a pivotal connection at one end thereof having a vertical axis passing through said cooperating edges at their most proximate portions; means at the opposite end of said frame structure including two relatively movable parts, one part being adapted for engagement with fixed means and the other part being engaged with said frame structure whereby upon relative movement of said parts said frame structure will be swivelled about said axis; and means for relatively moving said parts.

5. A bevel shear construction comprising a supporting base; a frame structure; adjacently disposed circular blades providing cooperating edges for cutting a plate; bearing means for said blades carried by said frame structure; a motor carried by said frame structure; means operably connecting said motor with said blades for rotating said blades; supporting means seated on said base for said frame structure including a pivotal connection at one end thereof having a vertical axis passing through said cooperating edges at their most proximate portions, said frame structure and said supporting means being adapted for horizontal movement on said base to adjust the position of said blades; means at the opposite end of said frame structure including two relatively movable parts, one part being adapted for engagement with fixed means and the other part being engaged with said frame structure whereby upon relative movement of said parts said frame structure will be swivelled about said axis; and means for relatively moving said parts.

6. A bevel shear construction comprising a frame structure; adjacently disposed circular blades providing cooperating edges for cutting a plate; bearing means for said blades carried by said frame structure; means for rotating said blades; supporting means for said frame structure including a pivotal connection at one end thereof having a vertical axis passing through said cooperating edges at their most proximate portions; means at the opposite end of said frame structure including a cylinder element and a piston element operably disposed in said cylinder element, one of said elements being engaged with said frame structure and the other of said elements being adapted for engagement with fixed means; and means for introducing and exhausting pressure fluid into and from the opposite ends of said cylinder to effect relative movement of said elements and thereby effect swivelling of said frame structure about said axis, the last said means including a manually operable control valve carried by said frame structure.

7. A bevel shear construction comprising a pit; a frame structure having its lower portion disposed in said pit; adjacently disposed circular blades providing cooperating edges for cutting a plate; bearing means for said blades carried by said frame structure positioning said blades above said pit; means for rotating said blades; supporting means for said frame structure including a pivotal connection at one end thereof having a vertical axis passing through said cooperating edges at their most proximate portions, said connection comprising a bearing carried by said frame structure, a second bearing supported on the bottom of said pit, and a pin extending through said bearings, said frame structure and supporting means being adapted for horizontal movement within said pit to adjust the positions of said blades; guide elements held in the opposite sides of said pit; means at the opposite end of said frame structure including two relatively movable parts, one part being engaged with said frame structure and the other part being engaged with said guide elements, whereby upon relative movement of said parts swivelling of said frame structure about said pivotal connection will be effected; and means for relatively moving said parts.

8. A bevel shear construction comprising a pit; a frame structure having its lower portion disposed in said pit; adjacently disposed circular blades providing cooperating edges for cutting a plate; bearing means for said blades carried by said frame structure positioning said blades above said pit; means for rotating said blades; supporting means for said frame structure including a pivotal connection at one end thereof having a vertical axis passing through said cooperating edges at their most proximate portions, said frame structure and supporting means being adapted for horizontal movement within said pit to adjust the positions of said blades; a rail secured along each of the opposite sides of said pit; a pressure fluid working cylinder carried by said frame structure at the opposite end thereof; a double-acting piston in said cylinder; piston rods extending in opposite directions from said piston; roller elements carried at the outer ends of said rods and engaging the respective said rails; and means for introducing and exhausting pressure fluid to and from the opposite ends of said cylinder to effect relative movement of said cylinder and said piston and thereby effect swivelling movement of said frame structure about said axis.

9. A bevel shear construction comprising a fixed supporting structure; a frame structure supported on said supporting structure; mechanism carried by said frame structure comprising adjacently disposed circular blades and means for rotating said blades, said frame structure being adapted for longitudinal movement relative to said supporting structure; a swivelling connection for said frame structure having a part engaged with said frame structure and a part engaged with said supporting structure, said parts being pivotally connected and said connection being adapted for longitudinal movement with said frame structure; and means for swivelling said frame structure having a part engaged with said frame structure and a part engaged with said supporting structure, and being adapted for movement relative to one of said structures to permit said longitudinal movement of said frame structure, said parts being adapted for relative movement to effect said swivelling.

10. In an apparatus for cutting a metal plate simultaneously along two spaced, parallel straight lines, the combination of a pair of adjacently disposed circular blades for cutting said plate along one of said lines; a pair of adjacently disposed circular blades for simultaneously cutting said plate along the other of said lines; means for rotating said blades; means for supporting said plate in position for said cutting along said lines; means for securing said plate in said position against movement in a transverse direction relative to said lines; means for relatively moving said plate and said blades in the same direction as said lines extend during the cutting operation; and separate turning means for each said pair for bodily turning the blades of said pair about an axis through said line of said pair perpendicular to said plate to vary the angle of said blades relative to said line during the cutting operation along said line.

11. In an apparatus for cutting a metal plate along a predetermined straight line, the combination of a pair of adjacently disposed circular blades for cutting said plate along said line; means for rotating said blades; means for supporting said plate in position for said cutting along said line; means for securing said plate in said position against movement in a transverse direction relative to said line; means for relatively moving said plate and said blades in the same direction as said line extends during the cutting operation; and turning means for said pair for bodily turning the blades of said pair about an axis through said line perpendicular to said plate to vary the angle of said blades relative to said line during the cutting operation along said line.

GEORGE K. HULL.